US006838036B2

(12) United States Patent
Sugimoto

(10) Patent No.: US 6,838,036 B2
(45) Date of Patent: Jan. 4, 2005

(54) METHOD FOR MANUFACTURING GOLF BALL

(75) Inventor: Kazushige Sugimoto, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 146 days.

(21) Appl. No.: 10/267,846

(22) Filed: Oct. 10, 2002

(65) Prior Publication Data

US 2003/0083152 A1 May 1, 2003

(30) Foreign Application Priority Data

Oct. 18, 2001 (JP) ....................................... 2001-320409

(51) Int. Cl.[7] ......................... B29C 43/04; B29C 43/18; B29C 43/50; B29C 43/56; B29C 33/10

(52) U.S. Cl. ....................... 264/320; 264/148; 264/161; 264/248; 264/250; 264/271.1; 264/279; 264/279.1; 425/420; 425/451.2; 425/813; 473/371; 473/373; 473/374; 473/375; 473/376; 473/377

(58) Field of Search ................................ 264/148, 161, 264/248, 250, 271.1, 279, 279.1, 320; 425/420, 812, 451.2; 473/371, 373–377

(56) References Cited

U.S. PATENT DOCUMENTS 695,867 A * 3/1902 Kempshall .................. 264/248
1,202,318 A * 10/1916 Roberts ...................... 473/367
2,961,713 A * 11/1960 Hartley ....................... 264/160
3,068,522 A * 12/1962 Nickerson et al. .......... 264/275
4,501,715 A * 2/1985 Barfield et al. ............. 264/248
5,424,017 A * 6/1995 Hinduja et al. ............. 264/163
5,945,047 A * 8/1999 Yukihiro et al. ........... 264/40.5
6,039,910 A * 3/2000 Tanaka et al. .............. 264/248
6,319,451 B1 * 11/2001 Brune ........................ 264/278
2004/0080080 A1 * 4/2004 Dalton et al. ............... 264/278

FOREIGN PATENT DOCUMENTS

GB 2125724 A * 3/1984 ........... B29D/31/00

* cited by examiner

*Primary Examiner*—Michael P. Colaianni
*Assistant Examiner*—Michael I. Poe
(74) *Attorney, Agent, or Firm*—Birch, Stewart, Kolasch & Birch, LLP

(57) ABSTRACT

A golf ball 1 has a core 2 and a cover 3. For molding a core 2, a rubber composition is extruded from a kneading machine, and cut at a predetermined length to obtain a preforming material. The preforming material is placed in a mold and the mold is clamped. An upper portion and lower portion of the mold mate for more than or equal to 15 seconds, and thereafter they are unclamped until a clearance between the upper and lower portions becomes from 3 mm to 8 mm, then, the mold is shut. The shutting time is determined to be from 0.5 second to 5.0 seconds. By this unclamping of the mold, a residual air in a spherical cavity is released, which results in elimination of defective products.

4 Claims, 3 Drawing Sheets

START
KNEADING — STP1
EXTRUDING — STP2
CUTTING — STP3
PLACING STEP — STP4
CLAMPING STEP — STP5
UNCLAMPING STEP — STP6
CROSSLINKING STEP — STP7
REMOVING STEP — STP8
FORMING OF COVER — STP9
END

METHOD FOR MANUFACTURING GOLF BALL

BACKGROUND OF THE INVENTION

1. Field of the Invention

The present invention is related to a method for manufacturing a golf ball and is particularly concerned with an improvement of compression molding of a golf ball or a sphere that forms a part of a golf ball.

2. Description of the Related Art

Solid golf balls having various types of layer construction are commercially available. For example, there are one-piece solid golf balls having a single layer, two-piece solid golf balls having a cover and a core of a single layer construction, and multi piece solid golf balls having a cover and a core of two layers. The two layers core comprises a center and a mid layer covering the center. One-piece golf balls and the cores of two-piece golf balls and the center and the core of the multi piece golf balls are all spherical. These spheres are generally made of a rubber composition.

A mold for manufacturing golf balls comprises an upper portion and a lower portion. Both upper and lower portions have a hemispheric cavity respectively. When the upper portion mates with the lower portion, a spherical cavity is formed by a pair of hemispheric cavities. When a core for two-piece golf balls is molded, a preforming material (which is referred to as a "plug") is placed in the mold. The preforming material is made of a rubber composition. Volume of a preforming material to be placed in each cavity is larger than that of the core to be molded. In other words, the volume of the preforming material is larger than the capacity of the spherical cavity. Due to this difference, when the mold is clamped gradually, excessive rubber composition outflows from the cavity. In accordance with the outflow of the excessive rubber composition, air is also released from the cavity. The mold is clamped and followed by heating to a predetermined temperature, and is kept at the temperature for a predetermined period of time. Thereby, a crosslinking reaction of a rubber initiates, thereby the rubber composition is cured to form a core. Thereafter, the mold is opened and a core is picked up from the mold.

Residual air in the cavity during the clamping step, if any, may generate convex portions (which is referred to as "bare") or tinned portions (which is referred to as "scorching") on the surface of a molded core. Particularly, when a preforming material of a cylindrical shape is placed in the cavity, a closed space is easily defined between the end portion of the preforming material and the interior surface of the cavity. The air remaining in such space is released form the cavity with difficulty.

One of the means to release the residual air from the mold is to use a large volume of preforming material so that a large amount of rubber composition outflows from the cavity with the residual air during the clamping step. This means is not sufficient to prevent a production of the above-mentioned defective cores, even if it may decrease the production of defective cores in some extents. Further, as the outflowed rubber composition is hardly recycled and needs to be disposed, a yield of the rubber composition becomes low, which results in cost increase of golf ball manufacturing.

Similar problems arise with a compression molding for manufacturing a center and a core of multi piece golf balls and one-piece golf balls.

SUMMARY OF THE INVENTION

The method for manufacturing a golf ball according to the present invention comprises the following steps A to F.

STP A is a preforming step to form a performing material which is substantially cylindrically shaped and is made of a rubber composition.

STP B is a placing step to place the preforming material in the mold comprising an upper portion and a lower portion both of which have a hemispherical cavity during the mold is opened.

STP C is a clamping step wherein the lower portion relatively comes close to the upper portion so that the lower portion mates with the upper portion.

STP D is an unclamping step wherein after mating of the upper and lower portions for more than or equal to 15 seconds during the clamping step, the lower portion moves relatively apart from the upper portion so that a clearance between the upper and lower portions becomes from 3 mm to 8 mm.

STP E is a crosslinking step wherein the lower portion relatively comes close to the upper portion until the upper and the lower portion mate again so that a crosslinking reaction initiates.

STP F is a removing step wherein the mold is opened to pick up a sphere from the cavity.

One of the advantages of the method for manufacturing a golf ball of the present invention is that air remaining in the cavity during the clamping step C is released from the cavity during the unclamping step. Accordingly, a bare or a scorching on the surface of the manufactured sphere will be hardly occurred.

A time period from when the upper portion and the lower portion start to move apart from each other during the unclamping step until when the upper and lower portions mate again is preferably from 0.5 second to 5.0 seconds. All residual air is liable to be released from the spherical cavity in accordance with these steps, and after releasing the air, fresh air will hardly flows into the cavity.

These steps are particularly useful for manufacturing a sphere having a diameter from 20 mm to 45 mm.

DESCRIPTION OF THE PREFERRED EMBODIMENTS

The present invention is hereinafter described in detail with appropriate references to the accompanying drawings according to the preferred embodiments of the present invention.

Figure 1:
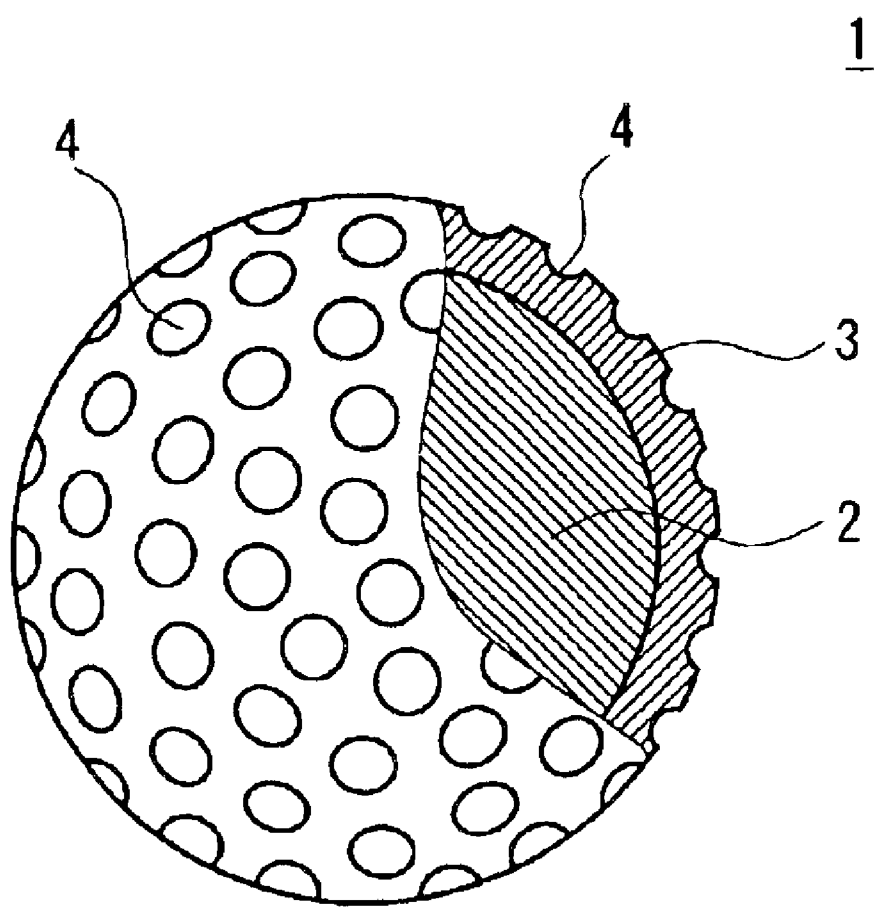
FIG. 1 is a schematic view illustrating a golf ball according to one embodiment of the present invention with a partially cut off cross-section.

A golf ball 1 depicted in FIG. 1 has a core 2 and a cover 3. On the surface of the cover 3, a large number of dimples 4 are formed. The golf ball 1 has a paint layer and a mark layer on the outer surface of the cover 3, although not shown in the Figure. The golf ball 1 has a diameter from 40 mm to 45 mm, more preferably from 42 mm to 44 mm. In light of the reduction of air resistance in the range to comply with a rule by United States Golf Association (USGA), the diameter is preferably from 42.67 mm to 42.80 mm. Further, this golf ball 1 has a weight of from 44 g to 46 g, and in particular, of from 45.00 g to 45.93 g.

Figure 2:
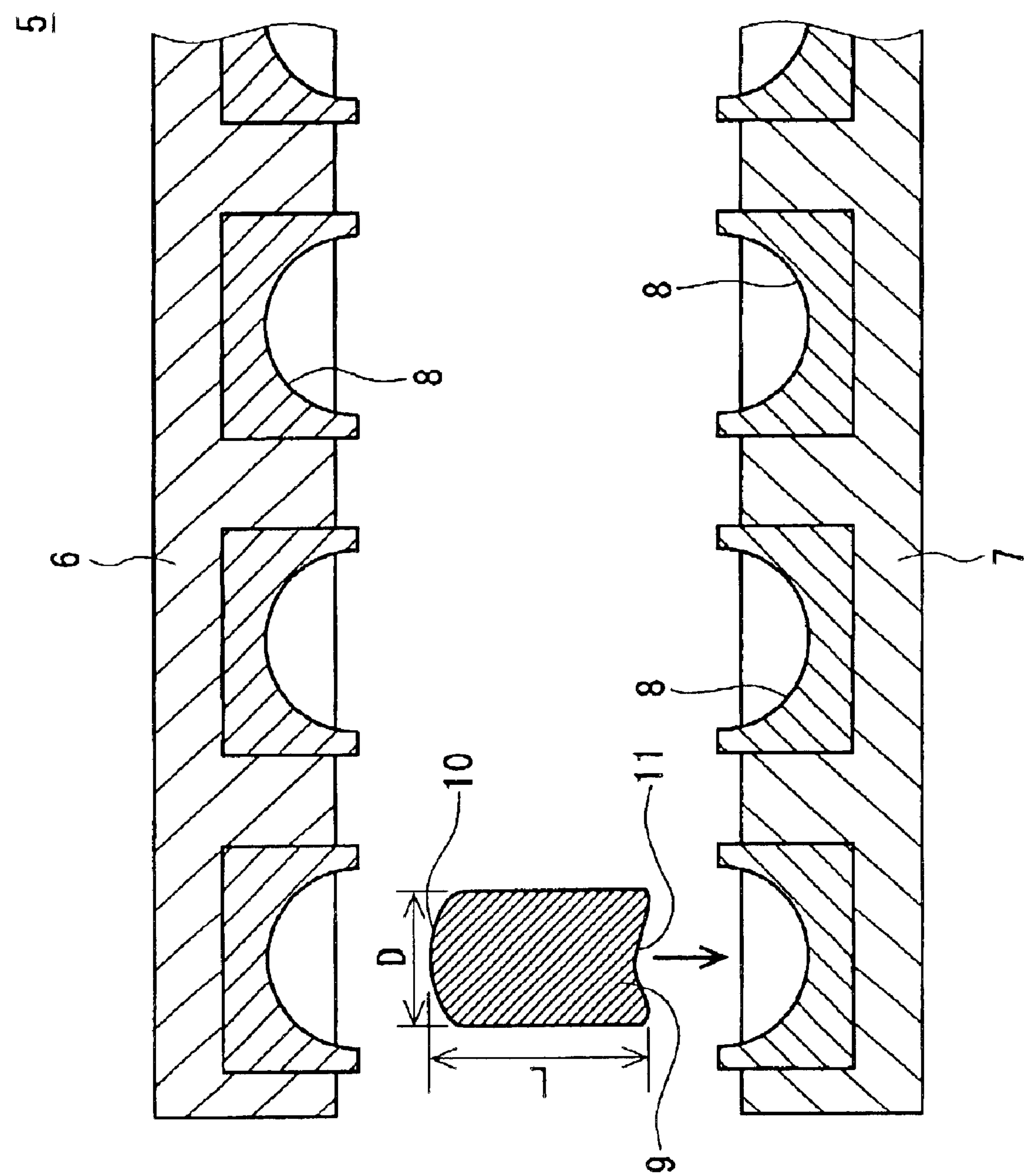
FIG. 2 is a sectional view illustrating a part of the mold for manufacturing a golf ball of FIG. 1; and, FIG. 3 is a flowchart illustrating one example of a process for producing the golf ball shown in FIG. 1.

FIG. 2 is a fragmentary sectional view showing the sectional part of the mold 5 used for manufacturing a golf ball of FIG. 1. The mold 5 comprises an upper portion 6 and a lower portion 7. Both the upper portion 6 and the lower portion 7 respectively have a large number of a cavity surface 8. A hemispherical cavity is formed by the cavity surface 8. When the upper portion 6 and the lower portion 7 mate, a large number of spherical cavity are formed.

Figure 3:
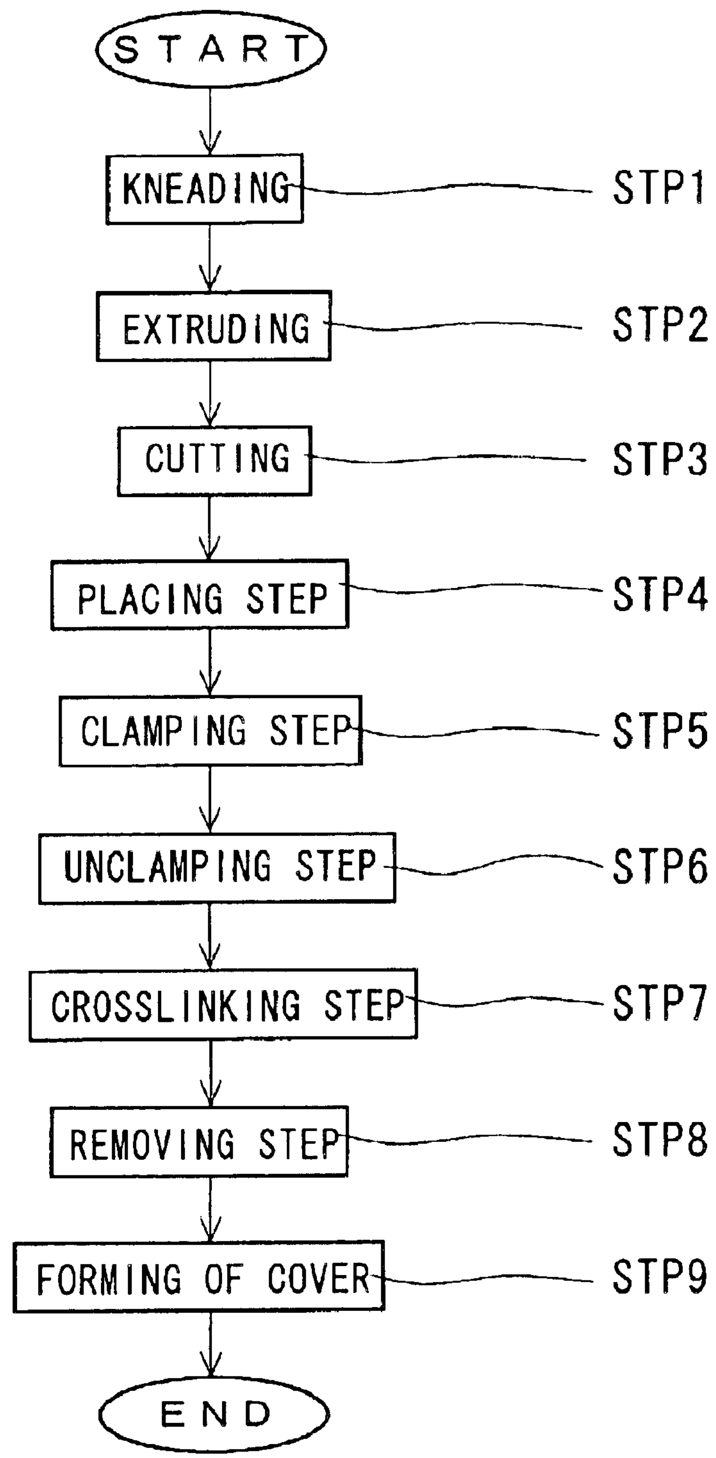

FIG. 3 is a flow chart illustrating one example of a method for manufacturing a golf ball of FIG. 1. In this method, a rubber material, crosslinking agent, additives and the like is kneaded (STP 1) to obtain a rubber composition. Then, the rubber composition is charged into a cylinder of an extruder and extruded from the extruder (STP 2). The extruder has a nozzle having a circular opening so that a section view of the rubber material being extruded thereby becomes circle.

A cutter (which is referred to as a "rotary cutter") is located at the opening end of the nozzle. One end of the cutter is axially mounted in such a manner that the cutter axially rotates. The cutter rotates and cuts the rubber composition at a predetermined length (STP 3). In this manner, a preforming material 9 as illustrated in FIG. 2 is obtained. The preforming material 9 has a cylindrical shape. Due to a variety of fluid velocity of the rubber composition at the extrusion, or due to a shrink of preforming material, one end of the preforming material sometimes becomes a convex portion 10 and the other end becomes a concave portion 11 as illustrated in FIG. 2.

As indicated by an arrow in FIG. 2, the preforming material 9 is placed in the mold 5 (STP 4), which is referred to as a placing step. Usually, the preforming material 9 is placed in a hemispheric cavity of the lower portion 7. The preforming material 9 is placed in the hemispheric cavity in such a manner that the axial direction of the pereforming material is set up vertically.

Next, the lower portion 7 gradually rises up until the upper portion 6 mates with the lower portion 7 (STP 5), which is referred to a clamping step. When the lower portion 7 rises, the preforming material 9 is pressurized. Generally, the mold 5 is heated in advance of the clamping step. The heat of the mold 5 is transmitted to the performing material by thermal conduction, thereby the temperature of the performing material rises. When the preforming material 9 is pressurized and heated, the rubber composition of the preforming material 9 fluids and the excessive rubber composition outflows from the cavity. This process accompanies with releasing of the air remaining in the cavity in such a manner that the residual air in the cavity is forced to move along the cavity surface 8. Even after the mating process of the upper portion 6 and the lower portion 7, it hardly occurs that all residual air release from the spherical cavity, namely, there may be air still remaining in the spherical cavity. Particularly, in case that the preforming material 9 having a concave portion 11, air easily remains in a space defined by the concave portion 11 and the cavity surface 8.

During the clamping step (STP 5), the upper portion 6 mates with the lower portion 7 for more than or equal to 15 seconds. Thereafter, the lower portion 7 starts to descend. The lower portion 7 continues to descend until a clearance between the upper portion 6 and the lower portion 7 becomes from 3 mm to 8 mm. When the lower portion descends, the internal pressure of the spherical cavity decreases. This process is referred to as an unclamping step (STP 6). The residual air in the cavity is heated and expanded during the clamping step (STP 5 ), then, during the unclamping step (STP 6) the residual air is released from the cavity. Unclamping step helps to decrease a productive liability of a golf ball 1.

Next, the lower portion 7 rises so that the upper portion 6 and the lower portion 7 mate again. Through keeping this mating state, the mold 5 is heated and a crosslinking reaction initiates, thereby the rubber composition is cured (STP 7). The step (STP 7) is referred to as a crosslinking step. Generally, preferable temperature of the mold 5 during the crosslinking step (STP 7) is from 140° C. to 180° C. Preferable crosslinking period is from 10 minutes to 40 minutes.

After termination of the corsslinking step (STP 7) , the mold 5 is opened and a spherical core 2 is picked up from the mold (STP 8). This step (STP 8) is referred to a removing step. A cover 3 is formed around the core 2 (STP 9) by a known procedure (e.g., an injection molding method), to obtain a golf ball 1.

As for the way that the upper portion relatively comes close to the lower portion, several variations may be chosen at a manufacturing scene. Such as, it is available either lifting up the lower portion or descending the upper portion. It may be also achieved by concurrently operating both of lifting up of the lower portion and descending of the upper portion. Generally, a pressing machine is operated to move the upper or lower portion.

Time period for keeping the mating state, namely, the time period between a mating of the upper and lower portions in the clamping step (STP 5) and a starting of the unclamping step (herein after referred to as a "shutting time") is preferably more than or equal to 15 seconds. When the shutting time is less than 15 seconds, heating and expanse of the residual air in the spherical cavity is insufficient, which results in that the residual air is released from the spherical cavity with difficulty. In this respect, a preferable shutting time is more than or equal to 20 seconds, particularly more preferable shutting time is more than or equal to 45 seconds. In case that the shutting time is considerably long, a productivity of golf balls decreases. In this respect, a preferable shutting time is less than or equal to 300 seconds, and more preferable shutting time is less than or equal to 270 seconds.

In the unclamping step (STP 6), when a clearance of the upper and lower portion becomes the largest, this distance between the upper and lower portions is referred to as a "clearance of unclamping." The clearance of unclamping is preferably from 3 mm to 8 mm. When the clearance of unclamping is below than this range, the residual air is released from the cavity with difficulty. In this respect, particularly preferable clearance of unclamping is more than or equal to 4 mm. On the other hand, when the clearance of unclamping is beyond the above range, a fresh air easily flows into the cavity. In this respect, the most preferable clearance of unclamping is less than or equal to 6 mm.

The time period from when the upper and lower portions start to move apart from each other in the unclamping step (STP 6) until when the upper and lower portions mate again in the crosslinking step (STP 7) is referred to a "time period of unclamping". Preferable time period of unclamping is from 0.5 second to 5.0 seconds. When the time period of unclamping is below than this range, the residual air is released with difficulty. In this respect, the time period of unclamping is preferably longer than or equal to 1.0 second, and particularly more preferable time period of unclamping is longer than or equal to 1.5 seconds. When a time period of unclamping is beyond the above range, a fresh air may flows into the spherical cavity. In this respect, preferable time period of unclamping is less than or equal to 4.0 seconds, particularly more preferable time period of unclamping is less than or equal to 3.5 seconds.

A temperature of a mold 5 during the unclamping step (STP 6) is preferably from 100° C. to 140° C. When a temperature of the mold is below this range, an expansion of the residual air in the spherical cavity is so insufficient that the residual air is released from the cavity with difficulty. In this respect, particularly preferable temperature is more than or equal to 110° C. When a temperature of the mold is beyond the above range, a crosslinking reaction initiates during the clamping step (STP 5) or during the unclamping step (STP 6). In this respect, particularly preferable temperature of the mold during the unclamping step is less than or equal to 130° C.

As another aspect of the present invention, it is also available to clamp the mold 5 after the above unclamping step (STP 6), and then, to proceed with the molding from the unclamping step again so that the residual air releases again from the spherical cavity. In other words, such unclamping step may be repeated twice or more.

A ratio of a volume of the preforming material to a capacity of the spherical cavity is preferably from 85% to 120%. When the ratio is below this range, the residual air is released with difficulty. In this respect, more preferable ratio is greater than or equal to 90%. When the ratio is beyond the above range, a large volume of rubber material outflows, which need to be exhausted. This results in increasing of a material cost for the golf ball 1. In this respect, particularly preferable ratio is less than or equal to 110%.

A ratio of a diameter D (See FIG. 2) of the preforming material 9 to an inner diameter of the spherical cavity is preferably from 60% to 90%. When the ratio is below this range, the preforming material 9 easily collapses during the clamping step (STP 5). In this respect, a preferable ratio is greater than or equal to 65%, particularly preferable ratio is greater than or equal to 70%. When a ratio is beyond the above range, the residual air is released from the cavity with difficulty. In this respect, more preferable ratio is less than or equal to 85%, particularly preferable ratio is less than or equal to 80%.

A ratio of a length L (See FIG. 2) of the preforming material 9 to an inner diameter of the spherical cavity is preferably from 110% to 180%. When a ratio is below this range, the residual air is released out with difficulty. In this respect, more preferable ratio is greater than or equal to 115%, particularly preferable ratio is greater than or equal to 120%. When a ratio is beyond the above range, the preforming material 9 easily collapses during the clamping step (STP 5). In this respect, more preferable ratio is less than or equal to 175%, particularly preferable ratio is less than or equal to 170%.

A ratio of a length L of the preforming material 9 to a diameter D (L/D) is preferably from 1.30 to 2.20. When a ratio (L/D) is below this range, the residual air is released from the cavity with difficulty. In this respect, more preferable ratio (L/D) is greater than or equal to 1.35, particularly preferable ratio is greater than or equal to 1.40. When a ratio (L/D) is beyond the above range, the preforming material easily collapses during the clamping step (STP 5). In this respect, more preferable ratio (L/D) is less than or equal to 2.15, particularly preferable ratio is less than or equal to 2.10.

The method of present invention may be applied for molding a sphere having a diameter of from 20 mm to 45 mm. More specifically, it may be applied for molding a one-piece golf ball, a core 2 of two-pieces golf ball and a center and a core of multi-piece golf ball. Usually, a diameter of one-piece golf ball is from 42.67 mm to 45 mm. Usually, a diameter of a core 2 of two-piece golf ball and a diameter of core of multi-pieces golf ball are from 30 mm to 41 mm. Usually, a diameter of a center of multi piece golf ball is from 20 mm to 38 mm.

A base rubber of the preforming material 9 suitably includes polybutadienes, polyisoprenes, styrene-butadiene copolymers, ethylene-propylene-diene copolymers (EPDM), natural rubbers and the like. Two or more kinds of these rubbers may be used in combination. In view of the resilience performance, polybutadienes are preferred. Even in the case where another rubber is used in combination with a polybutadiene, to employ a polybutadiene as a predominant component is preferred. More specifically, it is preferred that the ratio of the polybutadiene in total base rubber is greater than or equal to 50% by weight, and in particular, greater than or equal to 80% by weight. Among polybutadienes, high cis-polybutadienes are preferred, which have a percentage of cis-1, 4 bond of greater than or equal to 40%, in particular, greater than or equal to 80%.

Mode of crosslinking in the sphere is not particularly limited. Preferable co-crosslinking agent in view of the resilience performance includes monovalent or divalent metal salts of α,β-unsaturated carboxylic acid having 3 to 8 carbon atoms. Specific examples of the preferable co-crosslinking agent include zinc acrylate, magnesium acrylate, zinc methacrylate and magnesium methacrylate. In particular, zinc acrylate is preferred which can result in high resilience performance. An α,β-unsaturated carboxylic acid having 3 to 8 carbon atoms and a metal oxide may be blended as the co-crosslinking agent.

The amount of the co-crosslinking agent to be blended is preferably from 10 to 40 parts per 100 parts of the base rubber. When the amount to be blended is below the above range, the golf ball 1 may be so soft that insufficient resilience performance may be achieved. In this respect, the amount to be blended is preferably equal to or greater than 15 parts, and particularly preferably equal to or greater than 20 parts. When the amount to be blended is beyond the above range, the golf ball 1 may be so hard that soft feel at impact can not be experienced. In this respect, the amount to be blended is preferably equal to or less than 35 parts, and particularly preferably equal to or less than 30 parts.

In the rubber composition for use in the performing material 9, an organic peroxide may be preferably blended. The organic peroxide serves as a crosslinking agent in conjunction with the above-mentioned metal salt of α,β-unsaturated carboxylic acid, and also serves as a curing agent. By blending the organic peroxide, the resilience performance of the golf ball 1 may be improved. Suitable organic peroxide includes dicumyl peroxide, 1,1-bis(t-butylperoxy)-3,3,5-trimethylcyclohexane, 2,5-dimethyl-2,5-di(t-butylperoxy)hexane and di-t-butyl peroxide. Particularly versatile organic peroxide is dicumyl peroxide.

The amount of the organic peroxide to be blended is preferably from 0.1 parts to 3.0 parts per 100 parts of the base rubber. When the amount to be blended is below the above range, the golf ball 1 may be so soft that insufficient resilience performance may be achieved. In this respect, the amount to be blended is preferably greater than or equal to 0.2 parts, and particularly preferably greater than or equal to 0.5 parts. When the amount to be blended is beyond the above range, the golf ball 1 may be so hard that soft feel at impact can not be experienced. In this respect, the amount to be blended is preferably less than or equal to 2.8 parts, and particularly preferably less than or equal to 2.5 parts.

The rubber composition may be blended with a filler for adjusting specific gravity thereof. Examples of the suitable filler include inorganic salts such as zinc oxide, barium sulfate, calcium carbonate and the like; and powder of highly dense metal such as tungsten, molybdenum and the like. Preferable filler is zinc oxide because it serves not only as an agent for adjusting specific gravity but also as a crosslinking activator.

Various additives such as anti-aging agents, coloring agents, plasticizers, dispersant and the like may be blended at an appropriate amount to the rubber composition as needed.

EXAMPLES

[Embodiment 1]

A rubber composition was obtained by kneading 100 parts of polybutadiene ("BR01" trade name by JSR Corporation), 34 parts of zinc acrylate, 16.3 parts of zinc oxide and 1.0 part of dicumyl peroxide in an internal kneading machine. This rubber composition was charged in a cylinder of the kneading machine, extruded from the kneading machine through a nozzle with cutting by a rotary cutter at the predetermined length, thereby a preforming material is obtained. The preforming material is a substantially cylindrically shaped, which had a diameter D of about 30 mm, and length L of about 55 mm. Next, the preforming material was placed in a mold having spherical cavity having an inner diameter of 40.0 mm followed by rising up of the lower portion for a clamping. During this process, the temperature of the mold was 120° C. The mate of the upper portion and the lower portion was kept for 20 minutes, and thereafter, the lower portion descended until a clearance between the upper and lower portions became 5.0 mm. Soon after, the lower portion lifted up until it mated with the upper portion again. Time period of this unclamping was 3.0 seconds. Thereafter, the mold was heated to 170° C. and kept at this temperature for 20 minutes so that a corsslinking reaction initiated and the rubber composition is cured. Next, the mold was opened and a core having a diameter of 39.0 mm was obtained.

Examples 2–8 and Comparative Examples 1–3

The procedure of Example 1 was repeated except that each shutting time, clearance and time period of unclamping was altered respectively as shown in the following Table 1, and a core was obtained.

Comparative Example 4

The procedure of Example 1 was repeated except that an unclamping step after a clamping step was omitted, and heating of the mold was continuously kept to cause the crosslinking reaction, and obtained a core.

[Visual Evaluation]

The surface of the produced core was evaluated by a visual observation, in which those having a bear or a scorching were determined as defect. The results of testing on 100 dozen of golf balls are shown in as the fraction defectives in the following Table 1.

TABLE 1

Results of Visual Evaluation

| | Example 2 | Example 1 | Example 3 | Example 4 | Comparative Example 1 | Example 5 | Example 6 | Comparative Example 2 | Comparative Example 3 | Example 7 | Example 8 | Comparative Example 4 |
|---|---|---|---|---|---|---|---|---|---|---|---|---|
| Shutting time (second) | 20 | 20 | 20 | 20 | 20 | 20 | 20 | 20 | 5 | 15 | 270 | Without Unclamping Step |
| Clearance of unclamping (mm) | 5.0 | 5.0 | 5.0 | 5.0 | 1.0 | 3.0 | 8.0 | 10.0 | 5.0 | 5.0 | 5.0 | |
| Time period of Unclamping (second) | 0.5 | 3.0 | 5.0 | 10.0 | 3.0 | 3.0 | 3.0 | 3.0 | 3.0 | 3.0 | 3.0 | |
| Fraction defective (%) | 0.0 | 0.0 | 0.0 | 1.0 | 0.5 | 0.0 | 0.0 | 0.2 | 2.0 | 0.0 | 0.0 | 15.0 |

As shown in Table 1, the values of fraction defectives of Examples are much less than those of Comparative Examples. Accordingly, advantages of the present invention are clearly indicated by these results of evaluation.

The description herein above is merely for illustrative examples, and therefore, various modifications can be made without departing from the principles of the present invention.

What is claimed is:

1. A method for manufacturing a golf ball comprising the steps of;

a preforming step to form a preforming material which is substantially cylindrically shaped and is made of a rubber composition;

a placing step to place the preforming material in a mold comprising an upper portion and a lower portion both of which have a hemispherical cavity;

a clamping step wherein the lower portion is mated to the upper portion;

an unclamping step wherein after mating of the upper and lower portions for more than or equal to 15 seconds during the clamping step, the lower portion moves relatively apart from the upper portion so that a clearance between the upper and lower portions becomes from 3 mm to 8 mm;

a crosslinking step wherein the lower portion is again mated to the upper portion so that a crosslinking reaction initiates; and, a removing step wherein the mold is opened to remove a sphere from the cavity.

2. The method for manufacturing a golf ball according to claim 1, wherein a diameter of a sphere removed during the removing step is from 20 mm to 45 mm.

3. The method for manufacturing a golf ball according to claim 1, wherein a time period from when the upper portion and the lower portion start to move apart from each other during the unclamping step until when the upper and lower portions mate again is from 0.5 second to 5.0 seconds.

4. The method for molding a golf ball according to claim 3, wherein a diameter of a sphere removed during the removing step is from 20 mm to 45 mm.

* * * * *